United States Patent [19]

Poncelet et al.

[11] Patent Number: 5,714,309
[45] Date of Patent: Feb. 3, 1998

[54] ANTI-STATIC COMPOSITION AND PHOTOGRAPHIC MATERIAL CONTAINING A LAYER OF THAT COMPOSITION

[75] Inventors: Olivier Jean Christain Poncelet; Jeannine Rigola, both of Chalon-Sur-Saone, France

[73] Assignee: Eastman Kodak Company, Rochester, N.Y.

[21] Appl. No.: 735,766

[22] Filed: Oct. 23, 1996

[30] Foreign Application Priority Data

Oct. 25, 1995 [FR] France .................................. 95 12816

[51] Int. Cl.$^6$ .................................................. G03C 1/89
[52] U.S. Cl. ........................ 430/527; 430/531; 430/539; 252/518
[58] Field of Search .............................. 430/527, 530, 430/531, 539; 252/518

[56] References Cited

U.S. PATENT DOCUMENTS

| | | | |
|---|---|---|---|
| 4,152,404 | 5/1979 | Farmer | 423/327 |
| 4,252,779 | 2/1981 | Farmer | 423/329 |

FOREIGN PATENT DOCUMENTS

| | | |
|---|---|---|
| 569821 | 11/1993 | European Pat. Off. . |
| 657774 | 6/1995 | European Pat. Off. . |
| 2385646 | 10/1978 | France . |
| 63/98656 | 4/1988 | Japan . |
| 2025384 | 1/1980 | United Kingdom . |
| 96/13459 | 5/1996 | WIPO . |

OTHER PUBLICATIONS

European Polymer Journal, vol. 27, no. 7, 1991, pp. 609–612, "The Synthesis And Characterization Of Imogolite".
Chemical Abstract No. 91:178284n, vol. 91, 1979, p. 176.

*Primary Examiner*—Richard L. Schilling
*Attorney, Agent, or Firm*—Andrew J. Anderson

[57] ABSTRACT

The invention concerns a film-forming aqueous composition comprising a binder and an inorganic anti-static substance. The binder is in the form of a water-soluble polymer such as gelatin or hydroxyethyl cellulose free from any aluminum-chelating groups, and the anti-static substance is a fibrous inorganic polymer of the formula $Al_xSi_yO_z$, where x:y is between 1 and 3 and z is between 2 and 6. Such compositions are particularly applicable to obtaining anti-static layers for photographic materials.

11 Claims, No Drawings

ANTI-STATIC COMPOSITION AND PHOTOGRAPHIC MATERIAL CONTAINING A LAYER OF THAT COMPOSITION

FIELD OF THE INVENTION

The invention concerns an anti-static coatable composition, and a photographic material including an anti-static layer obtained from that composition.

BACKGROUND OF THE INVENTION

When plastic films are subjected to handling or physical or mechanical treatment, particularly treatment involving friction, their surface is charged with static electricity.

The static electricity causes dust to settle on the surface of the film, bringing a risk of luminous discharge, sparking or even ignition when the charge becomes high. When the plastic film is used as a carrier for a photographic material, these effects are particularly detrimental to the quality of the final image. For this reason many substances for reducing electrostatic charging have been proposed in prior art. They are mixed with various vehicles or additives which are then applied in layers to carriers or photographic materials. A review of anti-static substances for use in photography can be found, for example, in Research Disclosure no. 501, September 1994, publication 36544, page 520.

The very fact that so many substances are mentioned in this publication and the dates of the references show that it is difficult to find anti-static substances which give full satisfaction. Some substances interact with the constituents of the photographic material and the image-forming mechanism, others have insufficient stability or exude from the layers in which they have been incorporated, others are difficult to formulate because they need to be ground and dispersed with organic solvents and many, in short, do not have sufficient effect on electrostatic charging.

The applicant recently discovered a novel substance which is a fibrous inorganic polymer of aluminium and silicon with anti-static properties. This substance and a method of synthesising it are described in PCT Patent Application No. WO 96/13459, filed Oct. 24, 1995, the disclosure of which is incorporated herein by reference.

SUMMARY OF THE INVENTION

The subject of one embodiment of the present invention is a novel anti-static composition using the substance disclosed in the above-mentioned patent application.

The anti-static composition according to the invention is a film-forming aqueous composition comprising:

(i) a fibrous polymeric silicoaluminate of the formula $Al_xSi_yO_z$, where x:y is from 1 to 3 and z is from 2 to 6, and (ii) a water-soluble polymeric binder, the polymeric binder being free from any groups which could chelate the aluminium combined with the polymeric silicoaluminate. A further embodiment of the invention comprises a photographic material comprising a support, at least one image-forming photosensitive layer, and at least one layer comprising the above described anti-static composition.

According to the invention the polymeric binder of the anti-static composition is water-soluble, that is to say, when mixed with water in the proportions specified above and at a temperature from about room temperature to 75° C., it gives a homogeneous solution which is optically clear on examination with the naked eye.

DETAILED DESCRIPTION OF THE INVENTION

The polymeric binder of the composition according to the invention, when mixed with the polymeric silicoaluminate, must enable the fibrous structure of the latter as well as the Si/Al ratio and thus the inherent anti-static properties of the substance to be retained. For this reason one of the conditions to be observed according to the invention is that the polymeric binder should not contain any chelating groups which, by capturing the Al ions, would at the same time degrade the structure of the silicoaluminate and its anti-static properties. Chelating groups of this type are in particular acid groups, for example in polyacids such as polymers of acrylic acid or hydrolysed vinyl acetate. The binder must allow the formation of a composition which can be applied in a layer by normal methods, that is to say, particularly a composition of sufficient viscosity. The viscosities required to apply the various layers of a photographic material are well known. According to where the layer is to be used (backing, substrate, top layer) a person skilled in the art can thus adjust the viscosity of the coating compound with the usual parameters, concentrations, thickeners etc. The layer obtained must be compatible with the other layers of a photographic material, that it to say, it must after drying have appropriate adhesion to the adjacent layers and/or to the carrier.

Suitable polymeric binders include protein binders, for example gelatin, deionised gelatin, gelatin derivatives, hydrophilic cellulose substances such as methyl cellulose, ethyl cellulose, hydroxyethyl, cellulose, hydroxypropyl methyl cellulose and polyalkylene glycols such as polyethylene glycols, of a molecular weight from 1000 to $10^6$.

In the composition according to the invention the silicoaluminate is a fibrous substance, described in above-mentioned PCT Patent Application No. WO 96/13459. In this patent application the silicoaluminate is obtained by a method comprising the following main steps:

(a) mixing a mixed aluminium and silicon alkoxide or a precursor of such an alkoxide with an aqueous alkali at a pH from 4 to 6.5 and advantageously from 4.6 to 5.6, while keeping the concentration of aluminium from $5\times10^{-4}$ M to $10^{-2}$ M, (b) heating the mixture obtained in (a) to a temperature below 100° C. in the presence of silanol groups, for example in the form of finely divided silica, long enough to obtain a complete reaction resulting in the formation of a polymer, and (c) removing the ions from the reaction mixture obtained in (b).

The stage (b) reaction is considered to be complete when the reaction mixture no longer contains any cations other than those of the alkali, that is to say, when the Al and Si ions have been consumed.

In one embodiment the starting material at stage (a) is a precursor which is the product of a hydrolysis reaction on an aluminium salt, for example aluminium chloride, and a silicon alkoxide.

The silicoaluminate (expressed as total Al+Si) represents from 20 to 95% and preferably from 50 to 57% by weight of the total dry weight of the composition. This represents a binder/Al+Si weight ratio of 5 to 400%, advantageously from 75 to 100%.

If the binder/aluminosilicate ratio is too high, conductive properties are weakened and the anti-static effectiveness of the composition is reduced. If the binder/aluminosilicate ratio is too low, the composition, once applied in a layer, will have poor adhesion to adjacent layers and part of the aluminosilicate may further migrate into those adjacent layers.

The composition according to the invention may contain various additives which are normally used in compositions of this type and designed either to improve anti-static properties, for example doping or conductivity-improving agents such as lithium, calcium, magnesium or alkali metal/ alkaline earth metal salts, or to improve properties advantageous to coating, for example thickeners, wetting agents, surfactants or preservatives. Examples of additives and references to the literature published on that subject are given in *Research Disclosure*, Publication No. 36544, September 994, Chapter IX "Coating Physical Property Modifying Addenda", pages 519–520. *Research Disclosure* is published by Kenneth Mason Publications. Ltd., Dudley House, 12 North Street, Emsworth, Hampsire P010 7DQ, England. As far as metal cations are concerned, it is preferable for them not to be present in the polymeric binder at the initial stage.

As indicated, the polymeric binder preferably gives a homogeneous, optically clear and transparent solution which can be applied in a layer by conventional methods, if necessary in the presence of coating additives, thickeners or surfactants. The layer is obtained from the composition by normal coating methods, hopper, plate or curtain coating etc. The layer obtained is 0.1 to 10 µm thick after drying; thinner layers may be envisaged, but the anti-static properties are then less good. The layer is transparent, although this is not indispensable in the case of some photographic materials where the anti-static layer is applied, for example, to the back of an opaque carrier. The resistance of the layer is from $10^8$ to $5 \times 10^{11}$ ohm and preferably from $5 \times 10^8$ to $5 \times 10^{10}$ ohm at room temperature (25° C.) and a relative humidity of 25%.

As a general rule the binder used is not initially cross-linked, in order to encourage optimum mixing with the polymeric silicoaluminate, but the layer may nevertheless be tanned with tanning agents normally used in the preparation of photographic materials (see Research Disclosure, publication 36544, September 1994, chapter II-B, page 508).

In cases where the binder is gelatin or a gelatin derivative, it is necessary to adjust the pH of the composition to a value below the isoelectric point of gelatin in order to avoid precipitation.

The composition according to the invention may be applied to the preparation of backing layers, substrates, intermediate or top layers in any kind of photographic material where there is a need for an anti-static layer, particularly but not exclusively for a permanent, transparent anti-static layer, that is to say, a layer which, when the exposed photographic material has been processed, retains at least part of its anti-static properties, sufficient to avoid the disadvantages connected with the dust and dirt which are liable to be deposited on the surface of the material.

The support and image-forming photosensitive layers of the photographic materials of the invention, and any additional layers, may comprise any known types of suitable materials, such as described in *Research Disclosure*, Publication No. 36544 referenced above and the references cited therein. The support, e.g., may comprise substances described therein at Chapter XV, page 531 and preferably comprises a polyester or cellulose triacetate film.

The following examples are given to illustrate the invention.

EXAMPLE

Preparation of anti-static composition A

A polymeric silicoaluminate is prepared by the mode of operation in Example 2 o.f above-mentioned PCT Patent Application No. WO 96/13459.

This aluminosilicate contains 3.88 g Al+Si/litre, with an Al:Si molar ratio of 2. 1031 g of the aluminosilicate (4.0 g Al+Si) is mixed with 4.2% by weight of LiBr relative to the weight of Al+Si. 0.18% by weight of the non-ionic surfactant Tween 80™ is added relative to the weight of Al+Si.

The above composition is mixed with 400 g of a 1% by weight solution of dry gelatin by agitation, with the temperature kept at 40° C.

The volume is adjusted to 1600 ml with water to obtain a 2.5 g/l content of Al+Si.

Agitation of the mixture is continued for 1 hour 30 minutes with the temperature kept at 40° C.

The final composition contains one part by weight of silicoaluminate (expressed as Al+Si) per part by weight of gelatin.

EXAMPLE

Preparation of anti-static composition B

The mode of operation is the same as in Example 1, but this time 75% by weight of gelatin is used relative to the Al+Si.

EXAMPLE 1

Sample of each of compositions A and B are applied to the substrate-carrying surface of an ESTAR® polyester bas 17/100 mm thick, by extrusion coating with a conventional die. The samples are then dried. The samples are then dried in chambers with controlled pressure, temperature and air hygrometry.

EXAMPLE 2

An ESTAR® polyester base with a gelatin substrate is coated with samples of each of compositions A and B. A layer of silver bromoiodide emulsion (33.62 mg/m² of gelatin and 39 mg/m² of silver), formaldehyde-tanned and 6 µm thick, then a top layer of formaldehyde-tanned gelatin 9 mg/m² thick are applied to the layer of composition.

EXAMPLE 3

A layer of emulsion the same as that in Example 2, then an upper layer the same as that in Example 2 and finally a layer of composition A or composition B are applied to a 17/100 ESTAR® polyester carrier with a substrate. The material is dried in chambers with controlled pressure, temperature and air hygrometry.

EXAMPLE 4

The mode of operation is the same as in Example 3, except that a layer of composition B is applied to the back of the polyester carrier with a substrate (rather than above the upper layer of gelatin).

EXAMPLE 5 (Control)

The mode of operation is the same as in Example 3 but the layer of composition A or B is omitted.

Each of the samples prepared according to Examples 1–5 is tested to measure its surface resistance. For this purpose the charges are measured kinetically by the following procedure: a sample of film measuring 270×35 mm is arranged between two electrodes. The ends of the sample rest on the two electrodes. We then apply a voltage between the two electrodes and read a resistance value in ohms. Each sample is tested when freshly prepared and after being kept for 3 days at 22° C. and a relative humidity of 21%.

The results obtained are set out in the table below.

| EXAMPLE | COMPOSITION | RESISTANCE WHEN FRESHLY PREPARED | RESISTANCE AFTER 3 DAYS AT 22° C. AND 21% RELATIVE HUMIDITY |
|---|---|---|---|
| 1 | A | $8.82 \times 10^9$ | $3.74 \times 10^{10}$ |
|   | B | $3.75 \times 10^9$ | $1.60 \times 10^{10}$ |
| 2 | A | $7.46 \times 10^{11}$ | $8.2 \times 10^{11}$ |
|   | B | $6.18 \times 10^{11}$ | $7 \times 10^{11}$ |
| 3 | A | $5 \times 10^9$ | $3.5 \times 10^{10}$ |
|   | B | $12.5 \times 10^9$ | $8 \times 10^9$ |
| 4 | B | $5.29 \times 10^9$ | $3.75 \times 10^{10}$ |
| 5 | — | $>5 \times 10^{12}$ | $>5 \times 10^{12}$ |

These results show that when the samples have been kept for 3 days under conditions of relatively low humidity, encouraging electrostatic charging, their resistance retains a high enough value to give the material anti-static protection. The test on the "freshly prepared" sample is carried out 24 hours after the layer is obtained and dried.

Adhesion of the layer of emulsion to the anti-static layer is good with a gelatin/Al+Si ratio of 1:1.

The (dry) adhesion test is as follows. A sample of film with an incipient tear is used; an adhesive film (with the most regular possible adhesive power and no susceptibility to ageing, such as the 3M®-850 film) is applied to it and withdrawn in a sharp movement. In the case of good adhesion the adhesive film does not carry any emulsion film; in the opposite case it takes with it the emulsion film from the carrier, then the anti-static layer.

We claim:

1. A photographic material comprising a support, at least one image-forming photosensitive layer, and at least one layer of an anti-static composition comprising
   1) a fibrous polymeric silicoaluminate of the formula $Al_xSi_yO_z$ where x:y is between 1 and 3 and z is between 2 and 6 and
   2) a water-soluble protein, cellulose or polyalkylene glycol polymeric binder free from any aluminum-chelating groups.

2. A photographic material according to claim 1, wherein the binder is a hydrophilic protein polymer.

3. A photographic material according to claim 2, wherein the binder is gelatin or a gelatin derivative.

4. A photographic material according to claim 1, wherein the binder is a cellulose derivative.

5. A photographic material according to claim 4, wherein the binder is methyl cellulose, hydroxyethyl cellulose, ethyl cellulose or hydroxypropyl cellulose.

6. A photographic material according to claim 1, wherein the binder is a polyalkylene glycol.

7. A photographic material according to claim 1, wherein the polymeric silicoaluminate is obtained by the following method:
   (a) mixing a mixed aluminium and silicon alkoxide or a precursor of such an alkoxide with an aqueous alkali at a pH between 4 and 6.5, while keeping the concentration of aluminium between $5 \times 10^{-4}$ and $10^{-2}$ M,
   (b) heating the mixture obtained in (a) at a temperature below 100° C., long enough to obtain a complete reaction resulting in the formation of a polymer, and
   (c) removing the salts from the reaction mixture obtained in (b).

8. A photographic material according to claim 7, wherein the binder and the total Al+Si in the polymeric silicoaluminate are in a weight ratio between and 400%.

9. A photographic material according to claim 8, wherein the binder and the total Al+Si in the polymeric silicoaluminate are in a weight ratio between and 100%.

10. A photographic material according to claim 1, wherein the binder and the total Al+Si in the polymeric silicoaluminate are in a weight ratio between 5 and 400%.

11. A photographic material according to claim 10, wherein the binder and the total Al+Si in the polymeric silicoaluminate are in a weight ratio between 75 and 100%.

* * * * *

UNITED STATES PATENT AND TRADEMARK OFFICE
CERTIFICATE OF CORRECTION

PATENT NO. : 5,714,309
DATED : February 3, 1998
INVENTOR(S) : Olivier J. Poncelet, et. al.

It is certified that error appears in the above-identified patent and that said Letters Patent is hereby corrected as shown below:

Col. 6, line 35      change "between and 400%" to -- between 5 and 400%. --
Col. 6, line 38      change "between and 100%" to -- between 75 and 100%. --

Signed and Sealed this

Nineteenth Day of May, 1998

Attest:

BRUCE LEHMAN

*Attesting Officer*      *Commissioner of Patents and Trademarks*